United States Patent [19]
Smith et al.

[11] Patent Number: 6,082,649
[45] Date of Patent: Jul. 4, 2000

[54] FISHING REEL WITH TRIGGER ACTUATED BAIL ASSEMBLY

[75] Inventors: Benny E. Smith, Sebring, Fla.; Rayford A. Cockerham, Broken Arrow, Okla.; Young Kang; Robert L. Carpenter, both of Tulsa, Okla.

[73] Assignee: Brunswick Corporation, Tulsa, Okla.

[21] Appl. No.: 09/186,847

[22] Filed: Nov. 5, 1998

[51] Int. Cl.[7] .................................................. A01K 89/01
[52] U.S. Cl. ............................................................ 242/233
[58] Field of Search ............................................. 242/233

[56] References Cited

U.S. PATENT DOCUMENTS

| | | |
|---|---|---|
| 4,676,450 | 6/1987 | Carpenter et al. ......................... 242/233 |
| 4,824,040 | 4/1989 | Carpenter et al. ......................... 242/233 |
| 5,154,369 | 10/1992 | Smith . | 
| 5,613,645 | 3/1997 | Carpenter . |
| 5,620,149 | 4/1997 | Zurcher . |
| 5,662,283 | 9/1997 | Puryear et al. ............................ 242/233 |
| 5,667,159 | 9/1997 | Carpenter et al. ......................... 242/233 |
| 5,669,565 | 9/1997 | Zurcher et al. ............................ 242/233 |

FOREIGN PATENT DOCUMENTS

| | | | |
|---|---|---|---|
| 3218796 | 12/1982 | Germany ................................ | 242/233 |
| 4021425 | 1/1991 | Germany ................................ | 242/233 |

*Primary Examiner*—Donald P. Walsh
*Assistant Examiner*—Minh-Chau Pham
*Attorney, Agent, or Firm*—Wood, Phillips, VanSanten, Clark & Mortimer

[57] ABSTRACT

A fishing reel with a frame having a first axis and forward and rear ends spaced axially relative to the first axis and an operating mechanism on the frame. The operating mechanism includes a line carrying spool, a rotor that is rotatable around the first axis relative to the frame, a bail assembly on the frame which is changeable between a cast position and a retrieve position, a rotor operator, and a drive train through which the rotor is rotated around the first axis in response to operation of the rotor operator. The operating mechanism further has a bail actuating system for moving the bail assembly from the retrieve position into the cast position. The bail actuating system includes a bail moving assembly which moves in a fore and aft direction relative to the frame, and a motion changing linkage which produces a force on the bail assembly that urges the bail assembly from the retrieve position towards the cast position as an incident of the bail moving assembly moving from a normal position forwardly relative to the frame into an opening position. The bail moving assembly has a portion that cooperates with the frame to guide the bail moving assembly between the normal and opening positions.

20 Claims, 12 Drawing Sheets

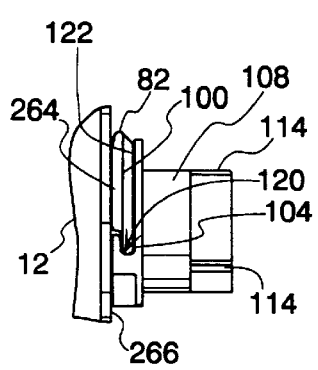
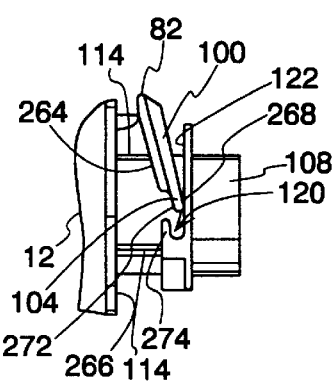
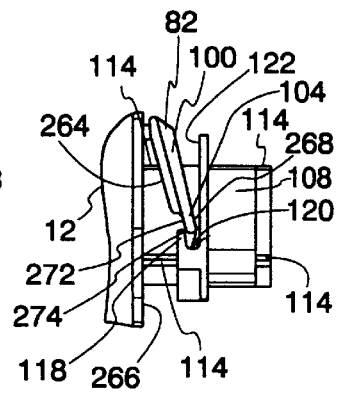
Fig. 9　　Fig. 10　　Fig. 11
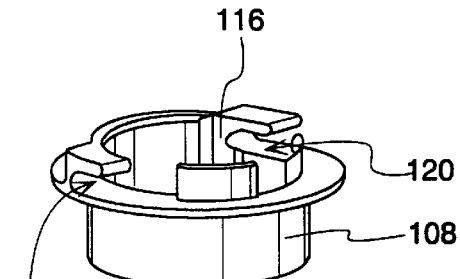
Fig. 12
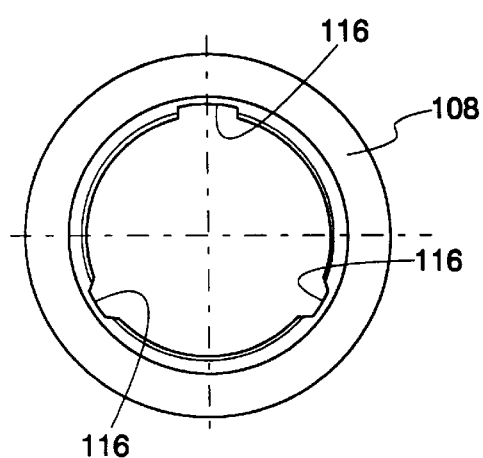
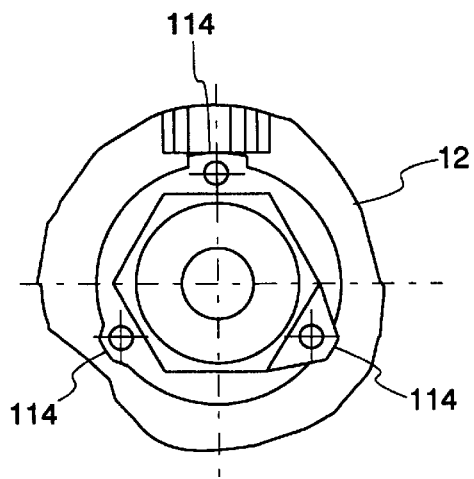
Fig. 13　　Fig. 14

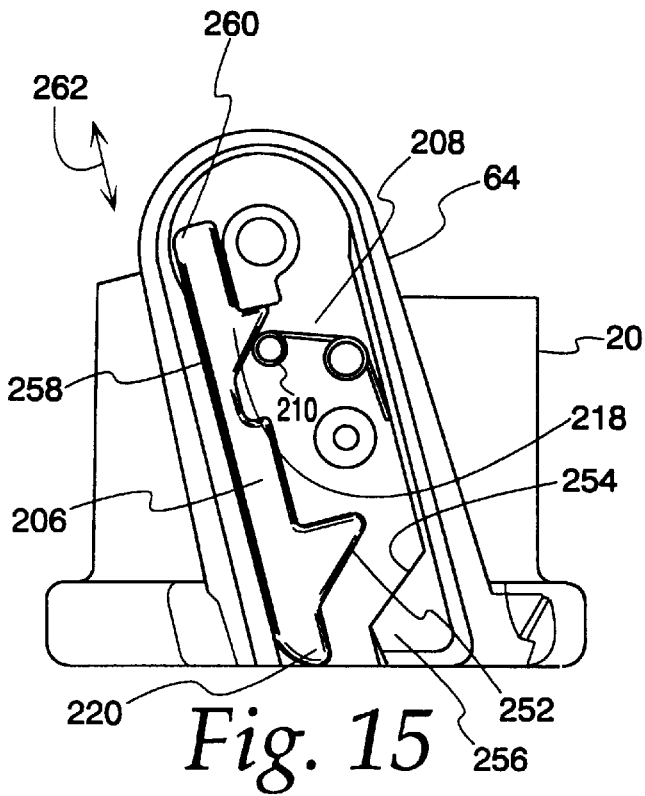
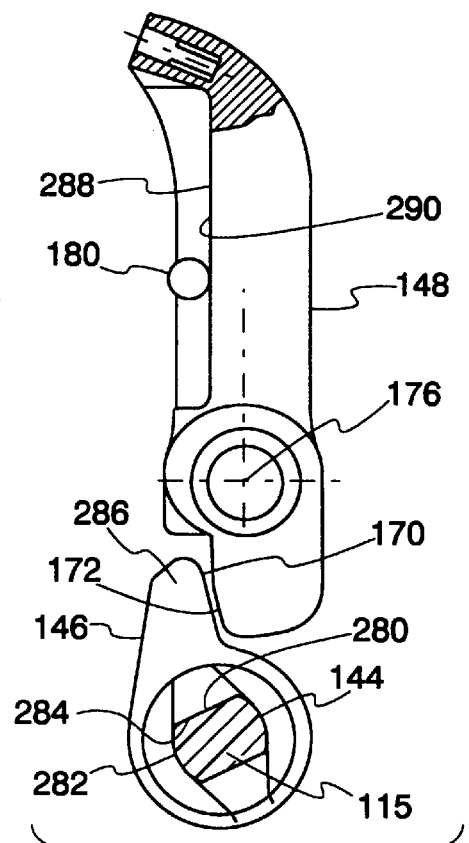
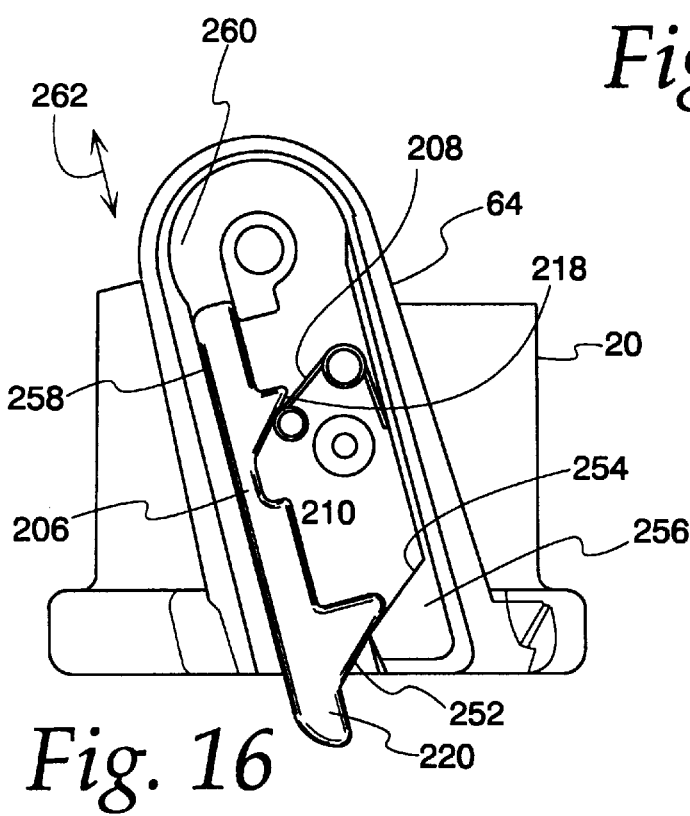
Fig. 15
Fig. 17
Fig. 16

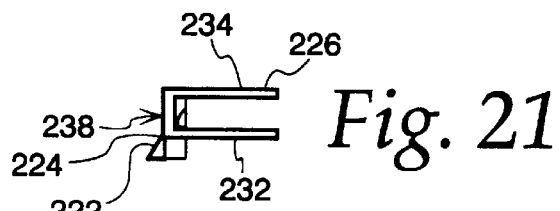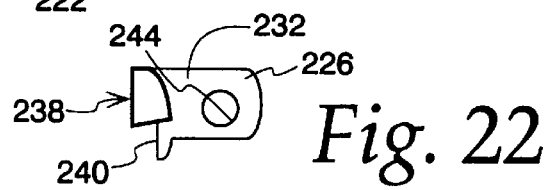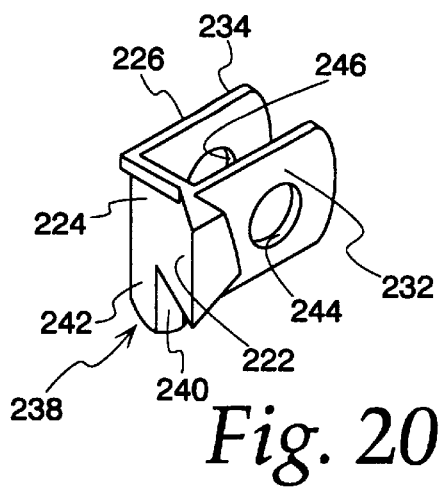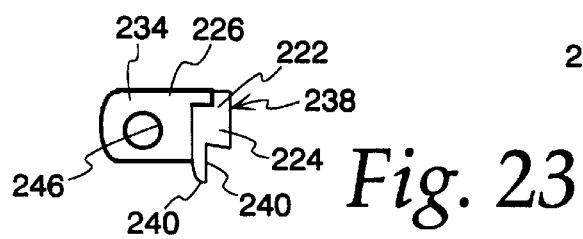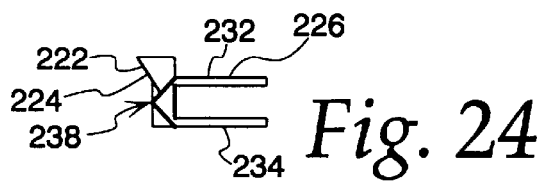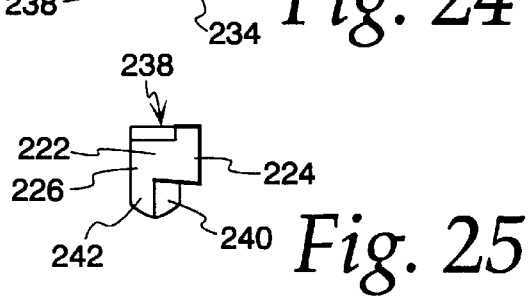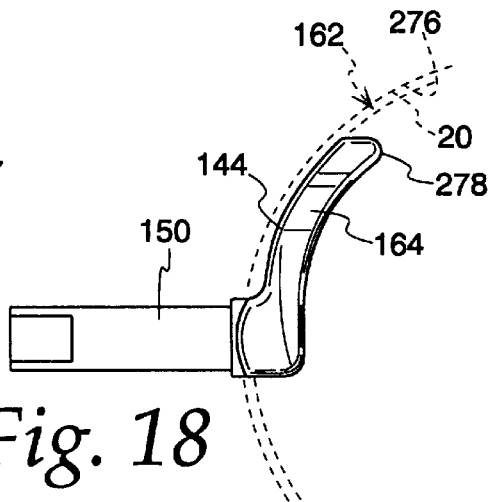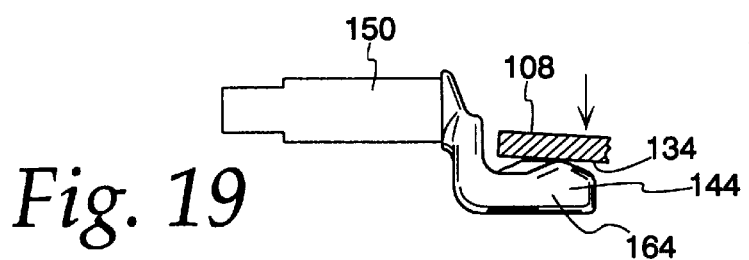

FISHING REEL WITH TRIGGER ACTUATED BAIL ASSEMBLY

BACKGROUND OF THE INVENTION

1. Field of the Invention

This invention relates to fishing reels of the type having a rotor with a bail assembly thereon that is rotatable to direct line onto a spool and, more particularly, to a fishing reel which has a trigger that is operable to change the bail assembly from a retrieve position into a cast position.

2. Background Art

One common fishing reel construction utilizes a rotor with a repositionable bail assembly thereon. Through a crank handle, a user imparts rotation to the rotor. As this occurs, the bail assembly, which is in a retrieve position, wraps line around a spool. By repositioning the bail assembly to a cast position, line can be freely paid off of the spool. By then operating the crank handle, the bail assembly is caused to be automatically moved from the cast position back into the retrieve position.

Various mechanisms have been devised to facilitate repositioning of the bail assembly. In its simplest form, this type of reel requires that a user manually grasp the bail assembly and effect pivoting movement thereof to change the bail assembly from the retrieve position into the cast position.

To avoid having to directly grasp the bail assembly, various trigger systems have been devised. In one form, a trigger is mounted on the rotor. By strategically situating the rotor, one or more fingers on the user's hand grasping the rod and reel can be used to operate the trigger and in one motion place the bail assembly in a cast position and draw the line against the rod to prevent payout as a cast is initiated. The user releases the line at the point that the rod is thrust forwardly to perform a cast.

The assignee herein offers a line of reels with a trigger feature which it identifies as its SNAPSHOT® fishing reels. These reels have a line holding feature which allows the user to, in one motion, reposition the bail assembly and hold the line without the user's having to at any point directly touch the line. The line becomes confined by a pin which remains in a holding position so long as the trigger is actuated. To initiate the cast, the user releases the trigger at the moment that the rod is thrust forwardly to allow line to pay out. The assignee offers a number of reels having this configuration wherein the trigger is mounted upon the rotor so that the rotor must be consistently oriented to allow convenient operation of the trigger. This structure is described in the assignee's U.S. Pat. Nos. 4,921,188 and 5,154,369.

The assignee offers an alternative mechanism in a fishing reel which it identifies as its HYPERCAST® fishing reels. One such construction is shown in U.S. Pat. No. 5,620,149. These reels incorporate a frame mounted trigger relative to which the rotor operates. The reels are designed so that the trigger can be actuated with the rotor in any rotational position to change the bail assembly from the retrieve position into the cast position.

The above lines of fishing reels have been highly commercially successful. As with virtually every commercial product, the designers thereof strive to increase manufacturing efficiency, and reduce manufacturing and costs without sacrificing performance and quality. Consistent with this goal is the reduction in the number of required parts and manufacturing steps. Reduction of the number of parts may result from simplification of design, which in turn may contribute greatly to reliability.

SUMMARY OF THE INVENTION

The invention is directed to a fishing reel with a frame having a first axis and forward and rear ends spaced axially relative to the first axis and an operating mechanism on the frame. The operating mechanism includes a line carrying spool, a rotor that is rotatable around the first axis relative to the frame, a bail assembly on the frame which is changeable between a cast position and a retrieve position, a rotor operator, and a drive train through which the rotor is rotated around the first axis in response to operation of the rotor operator. The operating mechanism further has a bail actuating system for moving the bail assembly from the retrieve position into the cast position. The bail actuating system includes a bail moving assembly which moves in a fore and aft direction relative to the frame, and a motion changing linkage which produces a force on the bail assembly that urges the bail assembly from the retrieve position towards the cast position as an incident of the bail moving assembly moving from a normal position forwardly relative to the frame into an opening position. The bail moving assembly has a portion that cooperates with the frame to guide the bail moving assembly between the normal and opening positions.

The bail actuating system may further include a trigger that is movable relative to the frame and the bail assembly between first and second positions. The bail moving assembly moves from the normal position into the opening position as an incident of the trigger moving from the first position into the second position.

The trigger may be pivotable around a second axis in moving between the first and second positions. The second axis may be substantially orthogonal to the first axis.

In one form, the portion of the bail moving assembly is substantially cylindrical and surrounds a projection on the frame and is guided by the projection between the normal and opening positions.

A rib and groove may be provided, one each on the bail moving assembly and projection on the frame, to cooperate to limit relative rotation between the bail moving assembly and projection on the frame around the first axis and guide the bail moving assembly between the normal and opening positions.

In one form, the bail moving assembly has a first receptacle and the trigger has a first free end which is movable within the first receptacle as the trigger moves between the first and second positions and the bail moving assembly moves between the normal and opening positions.

The trigger may have a second free end spaced from the first free end, with the bail moving assembly having a second receptacle, with the second free end being movable within the second receptacle as the trigger moves between the first and second positions and the bail moving assembly moves between the normal and opening positions.

The bail moving assembly may have a single piece which acts between the frame and the motion changing linkage.

The bail moving assembly may be guided in movement between the normal and opening positions independently of the rotor.

In one form, the motion changing linkage includes a link shaft that is pivotable around an axis that is transverse to the first axis to cause the bail assembly to change from the retrieve position into the cast position, with the bail moving assembly pivoting the link shaft as an incident of the bail moving assembly moving from the normal position into the opening position.

The motion changing linkage may include a link cam which pivots as one piece with the link shaft, with the link shaft and link cam being connected to each other through the rotor.

The bail assembly may include first and second bail arms pivotably attached to the rotor, with the motion changing linkage including a link arm lever assembly which is attached to the rotor for pivoting movement. The link arm lever assembly may directly engage the first bail arm and thereby pivot the bail assembly from the retrieve position towards the cast position as an incident of the link cam pivoting with the link shaft.

The link cam may act directly against the link arm lever assembly to effect pivoting of the link arm lever assembly as an incident of the link cam pivoting.

The bail actuating system may be constructed so that it does not act against the second bail arm so that a force produced on the bail arm by the bail moving assembly is transmitted directly to only the first bail arm and not the second bail arm.

In one form, the bail assembly includes a bail wire and a force on the second bail arm tending to move the bail assembly from the retrieve position into the cast position, as an incident of the bail moving assembly moving from the normal position into the opening position, is generated only through the bail wire.

The bail assembly may be pivotable between the cast and retrieve positions.

In one form, the rotor is pivotable through a range of 360° around the first axis and the trigger is movable between the first and second positions to change the bail assembly from the retrieve position into the cast position with the rotor situated through substantially the entire 360° range.

In one form, a pin projects from the link arm lever assembly and is movable with the link arm lever assembly towards the bail wire, to hold line projecting from a line carrying spool with the trigger in the second position, and away from the bail wire to allow line on the line carrying spool to pay off of the line carrying spool with the trigger in the first position.

In one form, the bail moving assembly acts directly against the link shaft, the link shaft has one piece that is acted directly upon by the bail moving assembly and acts directly against the link cam, and the link arm lever assembly has one piece which is acted directly upon by the link cam and which acts directly against the first bail arm.

BRIEF DESCRIPTION OF THE DRAWINGS

FIG. 9 is a fragmentary, side elevation view showing the relationship between the trigger and a bail moving assembly with the trigger in the first position therefor;

FIG. 10 is a view as in FIG. 9 with the trigger being moved towards the second position;

FIG. 11 is a view as in FIGS. 9 and 10 with the trigger in the second position;

FIG. 12 is an enlarged, perspective view of the bail moving assembly shown in FIGS. 9–11;

FIG. 13 is an enlarged, front elevation view of the bail moving assembly in FIGS. 9–12;

FIG. 14 is a fragmentary, front elevation view of a frame on the fishing reel at a location where the bail moving assembly is attached thereto;

FIG. 15 is an enlarged, side elevation view of a rotor on the inventive fishing reel with the trip link in a retracted position;

FIG. 16 is a view as in FIG. 17 with the trip link in an extended position;

FIG. 17 is an enlarged, elevation view showing the relationship between a link shaft, a link cam, and a link cam arm lever assembly which transmit a force from the bail moving assembly to the bail assembly;

FIG. 18 is an enlarged, rear elevation view of the link shaft of FIG. 17 in relationship to the rotor and bail moving assembly;

FIG. 19 is an enlarged, side elevation view of the link shaft in relationship to the bail moving assembly;

FIG. 20 is an enlarged, perspective view of an element mounted on the trigger and defining the trip link actuator surface for cooperating with the trip link to cause the trip link to urge the bail assembly from the cast position into the retrieve position;

FIG. 21 is an enlarged, top view of the element in FIG. 20;

FIG. 22 is an enlarged, elevation view of the element in FIGS. 20 and 21 from one side thereof;

FIG. 23 is an enlarged, elevation view of the element in FIG. 22 from the side opposite to that in FIG. 22;

FIG. 24 is an enlarged, bottom view of the element in FIGS. 20–23; and

FIG. 25 is an enlarged, front elevation view of the element in FIGS. 20–24.

DETAILED DESCRIPTION OF THE DRAWINGS

Figure 1A:
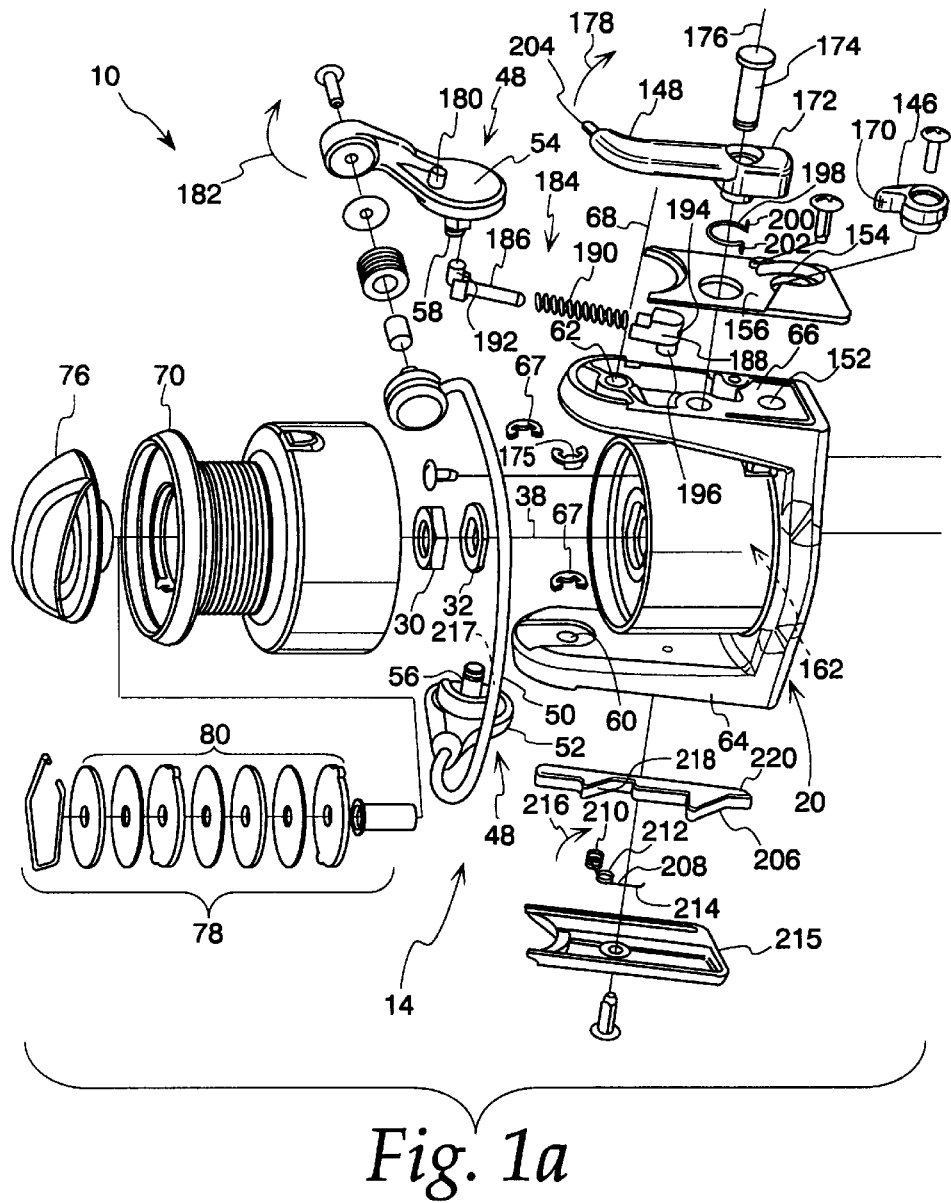
FIGS. 1a–1c, collectively, are an exploded, perspective view of a fishing reel made according to the present invention.
Figure 1B:
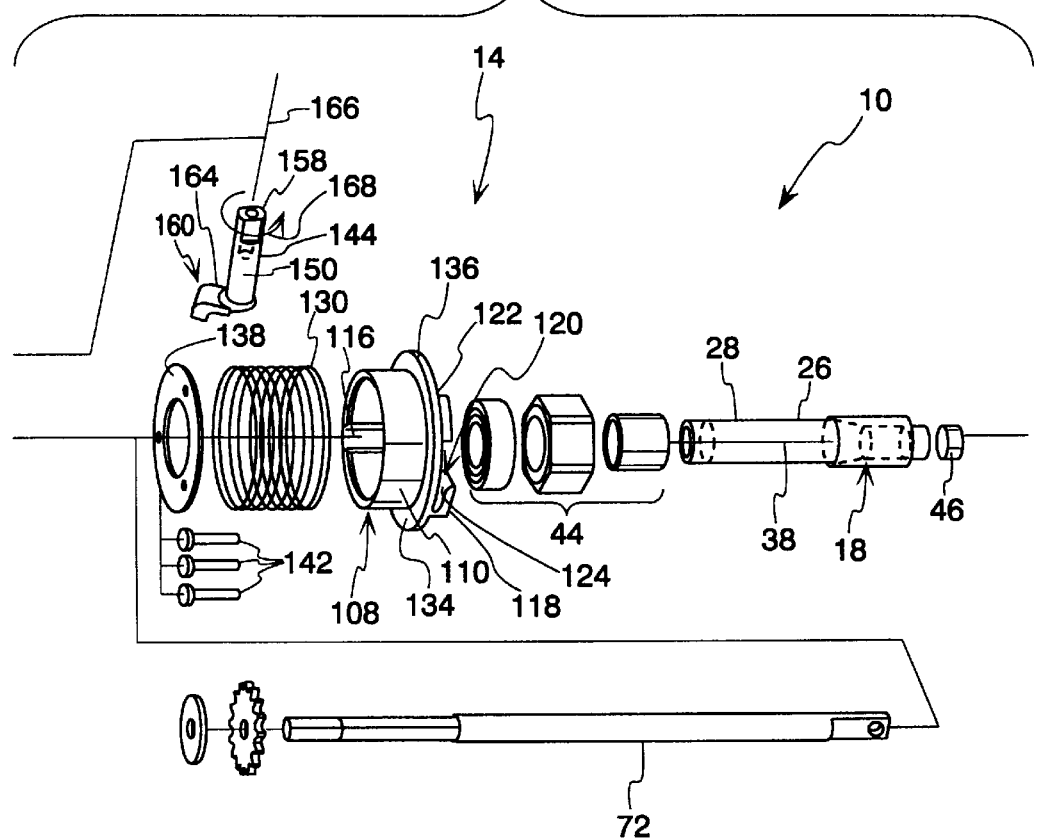
Figure 1C:
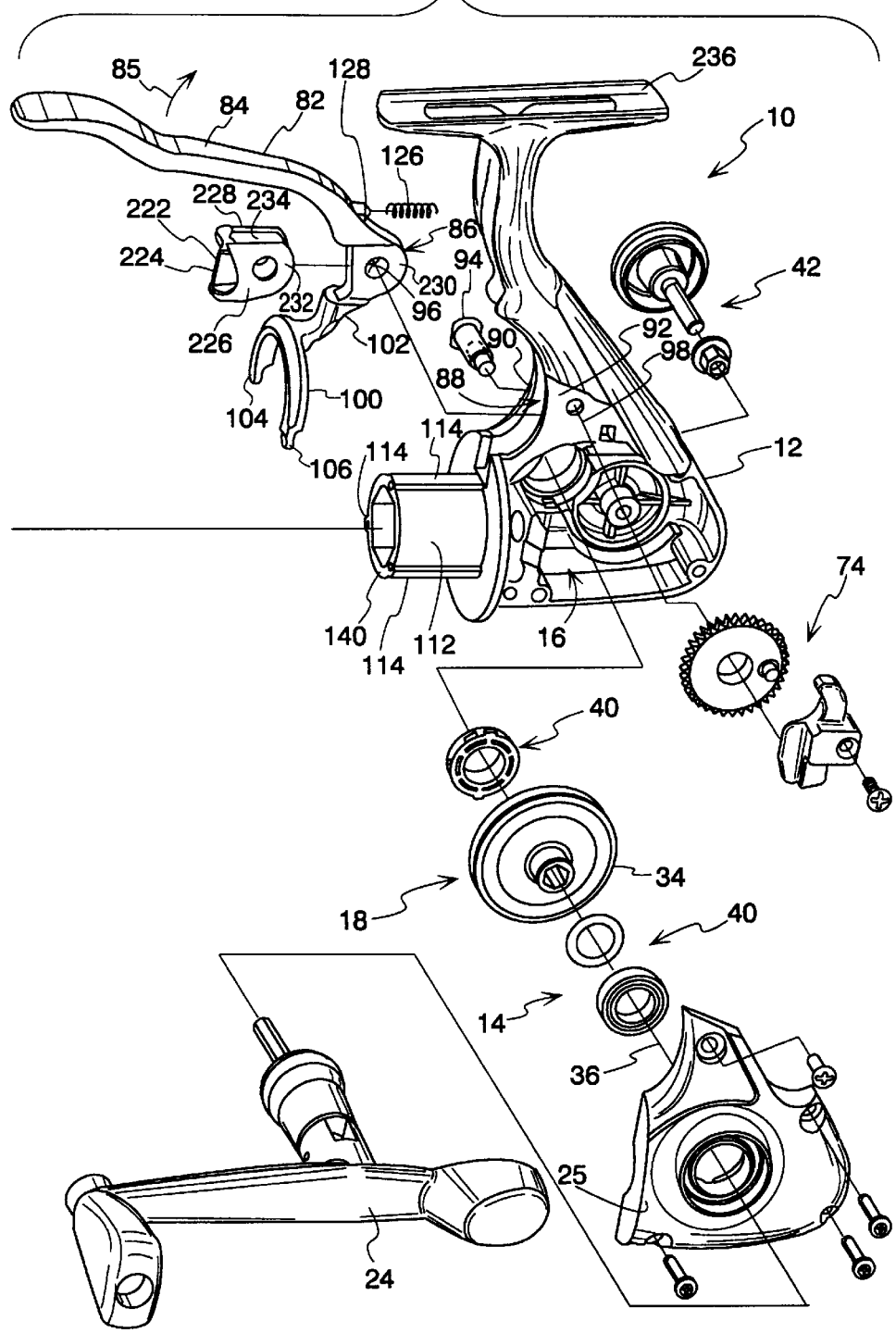

The present invention is capable of being incorporated into fishing reels having many different configurations. In FIG. 1, one form of fishing reel is shown at 10 into which the present invention can be incorporated. The overall operation of the fishing reel 10 will be described generally with respect to FIG. 1.

The fishing reel 10 consists of a frame 12 to which an operating mechanism 14 is mounted. The frame 12 defines a space 16 for part of a drive train 18 through which rotation of a rotor 20 is imparted through one of two alternative styles of rotor operator/crank handle 22, 24. The space 16 can be accessed through a removal cover 25. The drive train 18 includes a pinion gear 26 having a forward projection 28 thereon which extends through the rotor 20 and which is secured thereto using a nut 30 and washer 32. The pinion gear 26 is in mesh with a drive gear 34 driven by the crank handle 22, 24. The crank handle 22, 24 rotates the drive gear 34 about a laterally extending axis 36 and is in mesh with, and rotates, the pinion gear 26 about a fore and aft axis 38 that is orthogonal to the axis 36.

A bushing assembly at 40 is used to mount the drive gear 34 and crank handle 22, 24. The crank handle 22, 24 and a handle mounting screw assembly 42 project oppositely through the frame 12, drive gear 34, and bushing assembly 40 to mount the crank handle 22, 24 releasably to the frame 12. This arrangement permits selective left and right side mounting of the crank handle 22, 24. The pinion gear 26 is mounted to the frame 12 using a one-way bearing assembly 44 and bushing 46.

The rotor 20 has a bail assembly at 48 thereon. The bail assembly 48 consists of a bail wire 50 which is attached at its ends to bail arms 52, 54 which have posts 56, 58, respectively, which project through bores 60, 62 through diametrically oppositely located ears 64, 66 on the rotor 20. Clips 67 attach to the posts 56, 58 to maintain the bail arms 52, 54 on the rotor 20. The bail assembly 48 is thus mounted for pivoting movement relative to the rotor 20 around an axis 68 between a retrieve position (see FIGS. 2, 7 and 8), and a cast position (see FIGS. 5 and 6).

In the cast position, fishing line is allowed to freely pay off of a line carrying spool 70. With the bail assembly 48 in the retrieve position, rotation of the rotor 20 and bail assembly 48 cause line to be engaged in a conventional manner by the bail assembly 48 and wrapped around the spool 70. To effect even line distribution, the spool 70 is mounted to a shaft 72 which is reciprocatively moved in a fore and aft direction, parallel to the axis 38. This reciprocative movement is imparted through an oscillating mechanism 74 in the space 16. As the crank handle 22, 24 is rotated, the spool 70 is caused to reciprocate relative to the rotor 20 as the rotor 20 rotates around the axis 38.

The spool 70 is maintained on the shaft 72 by a nut (not shown) within a knob 76. Between the knob 76 and spool 70, a mounting and drag assembly 78 is provided. By rotating the knob 76, pressure exerted between a stack of drag washers 80 is changed to vary a torque that must be applied to the spool 70 to cause the spool 70 to slip relative to the shaft 72.

The bail assembly 48 is changeable by the user from the retrieve position into the cast position by operating a trigger 82 which is accomplished by grasping an actuating arm 84 thereon and drawing the arm in the direction of the arrow 85. The trigger 82 has a mounting portion at 86 which resides in a cavity 88 defined between laterally spaced walls 90, 92 on the frame 12. A mounting pin 94 extends through the walls 90, 92 and through a bore 96 in the mounting portion 86 on the trigger 82 residing between the walls 90, 92. With this arrangement, the trigger 82 is pivotable about the pin 94 and a laterally extending axis 98 between a first position, shown in FIGS. 2 and 6–8, and a second position, shown in FIG. 5.

The trigger 82 has an inverted, U-shaped yoke 100 which is carried by a depending arm 102 on the trigger 82 so that two spaced free ends 104, 106 on the yoke 100 shift forwardly relative to the frame 12 as the trigger 82 pivots from the first position into the second position. This forward movement of the yoke ends 104, 106 is imparted to a bail moving assembly 108.

The bail moving assembly 108 has a cylindrical portion 110 that surrounds and is guidable slidingly along a cylindrical projection 112 on the frame 12. The cylindrical projection 112 has three radially projecting, elongate ribs 114 which are spaced equidistantly around the circumference thereof for reception, one each, in complementary grooves 116 (one shown) in the bail moving assembly 108. The cooperating ribs 114 and grooves 116 limit relative rotation between the bail moving assembly 108 and cylindrical projection 112 and assure that the bail moving assembly 108 moves in a straight path, parallel to the axis 38, between a normal position, shown in FIGS. 7–9, and an opening position, show in FIG. 10. With this arrangement, the bail moving assembly 108 is guided between the normal and opening positions independently of the rotor.

The bail moving assembly 108 is formed as one piece and has diametrically opposite, L-shaped tabs 118 (one shown in FIG. 1) which each define a receptacle 120. Each receptacle 120 accommodates one of the yoke free ends 104, 106. As the trigger 82 is moved from the first position into the second position, exemplary free end 106 bears upon a rearwardly facing surface 122 on the bail moving assembly 108 bounding the receptacle 120 to urge the bail moving assembly 108 forwardly. As the trigger 82 moves from the second position towards the first position, the yoke free end 106 bears against a forwardly facing surface 124 on the tab 118 bounding the receptacle 120, thereby drawing the bail moving assembly 108 rearwardly. The yoke free end 106 and receptacle 120 are relatively dimensioned so that the free end 106 can move freely therewithin to prevent binding.

The trigger 82 is normally biased into the first position. This can be accomplished through two different spring arrangements which could be used individually or redundantly. A coil spring 126 is mounted to a post 128 on the trigger 82 above the bore 96 and acts against a surface within the cavity 88 on the frame 12 to exert a counterclockwise bias on the trigger 82 in FIG. 1, thereby urging the trigger 82 into the first position.

An optional second coil spring 130 surrounds the cylindrical portion 110 of the bail moving assembly 108 and acts between an annular surface 134 defined by a radially enlarged flange 136 on the bail moving assembly 108 and a plate 138 which is fixedly secured at the free end 140 of the cylindrical projection 112 by screws 142. Forward shifting of the bail moving assembly 108 compresses the spring 130, producing a residual force which drives the bail moving assembly 108 back to the normal position as the pivoting force exerted on the trigger 82 is released by the operator.

The bail moving assembly 108 indirectly acts against the bail assembly 48 through a cooperating arrangement of a link shaft 144, a link cam 146, and a link arm lever assembly 148. The link shaft 144 has a cylindrical body 150 which projects through a bore 152 in the rotor ear 66 and an aligned bore 154 through a cover plate 156. A keyed end 158 on the body 150 is exposed at the cover 156 with the opposite end 160 residing within a cavity 162, defined at the rear of the rotor 20. The bail moving assembly 108 advances forwardly within the cavity 162 when moved from the normal position into the opening position. The end 106 has a cantilevered arm 164 which resides in the path of movement of the annular surface 134 on the bail moving assembly 108. As the bail moving assembly 108 advances forwardly into the cavity 162, the surface 134 acts on the arm 164 and thereby cams the link shaft 144 pivotably around the axis 166 of the body 150 in the direction of the arrow 168.

The end 158 of the link shaft 144 projects into the link cam 146 and is keyed thereto so that the link cam 146 follows the aforementioned pivoting movement of the link shaft 144 around the axis 166. As this occurs, a cam surface 170 on the link cam 146 is driven against a surface 172 on the link arm lever assembly 148. The link arm lever assembly 148, which is attached to the rotor 20 through a pin 174 and clip 175 for rotation around an axis 176, is caused to be pivoted about the axis 176 in the direction of the arrow 178. As this occurs, the link arm lever assembly 148 engages a post 180 on the bail arm 54, which is offset from the pivot axis 68, so that the bail arm 54 pivots in the direction of the arrow 182, thereby driving the bail assembly 48 from the retrieve position towards the cast position. The cooperating parts are relatively dimensioned so that the bail assembly 48 moves sufficiently towards the cast position that it can be driven fully thereinto by an overcenter bias mechanism 184.

The overcenter mechanism at 184 consists of a shaft element 186, a shaft receiver element 188, and a coil spring 190. The shaft element 186 has a post 192 which is pivotably mounted to the bail arm 54 at a location offset from the axis 68. The shaft element 186 projects through the spring 190 and a bore 194 through the shaft receiver element 188. The shaft receiver element 188 has a post 196 which is directed into the ear 66 for rotation around an axis that is parallel to, and spaced from, the rotational axis of the post 192.

The posts 192, 196 are relatively positioned so that with the bail assembly 48 moved toward the retrieve position, the spring 190 acts between the shaft element 186 and shaft receiver element 188 so as to exert a torque on the bail assembly 48, driving the bail assembly 48 fully into the retrieve position. Once the bail assembly 48 is moved from the retrieve position towards the cast position to beyond an overcenter position, the spring 190 acts between the shaft element 186 and shaft receiver element 188 to drive the bail assembly 48 fully into the cast position.

The link arm lever assembly 148 is normally biased in rotation relative to the pin 174 oppositely to the direction of the arrow 178 by a torsion spring 198. The torsion spring 198 has a circular shape with offset free ends 200, 202 which project oppositely into the link arm lever assembly 148 and the rotor ear 66. As the link arm lever assembly 148 pivots in the direction of the arrow 178, the torsion spring 198 is loaded to produce a force tending to pivot the link arm lever assembly 148 oppositely to the direction of the arrow 178 around the pin 174. With the trigger 82 in the second position, the link arm lever assembly 148 is situated so that a cantilevered pin 204 on the end of the link arm lever assembly 148 moves to adjacent the bail wire 50 and holds line extending from the spool 70 so that the user does not have to directly engage the line at the initiation of a cast. This structure is the subject of U.S. Pat. Nos. 4,921,188 and 5,154,369 owned by the assignee herein. The disclosure of each of these patents is incorporated hereon by reference.

Casting is performed by maintaining the trigger 82 in the second position until a forward thrust is developed on the reel 10, at which point the trigger 82 is released and driven back to the first position, rearwardly drawing the bail moving assembly 108 back towards the normal position in the process. This allows the torsion spring 198 to drive the link arm lever assembly 148 pivotably oppositely to the direction of the arrow 178, which in turn causes the link cam 146 and link shaft 144 to be driven together around the axis 166 oppositely to the direction of the arrow 168. With the link arm lever assembly 148 in this position, the pin 204 moves sufficiently away from the bail wire 50 so that it does not interfere with line being paid off of the spool 70.

At the completion of a cast, the bail assembly 48 is movable back from the cast position into the retrieve position by operating the crank handle 22, 24. This is accomplished through a trip link 206 which is mounted on the rotor ear 64 for movement relative thereto between a retracted position, shown in FIGS. 2, 7, 8, and 15, and an extended position, shown in FIGS. 5, 6, and 16. The trip link 206 translates between the extended and retracted positions therefor. A loading spring 208 has a single piece of wire which is formed to define first and second coils 210, 212 and a loading arm 214 projecting from the second coil 212. The second coil 212 is placed over a post on the bail ear 64 with the loading arm 214 abutting a wall on the ear 64 and is captively held in place by a cover 215, which likewise prevents separation of the trip link 206. Pivoting of the first coil 210 relative to the second coil 212 in the direction of the arrow 216 loads the spring 208.

In operation, as the bail assembly 48 moves from the retrieve position towards the cast position, a post 217 on the bail arm 52 engages the trip link 206. Continued pivoting of the bail assembly 48 drivingly translates the trip link 206 from the retracted position into the extended position. As this occurs, a surface 218 on the trip link 206 moves the coil 210 on the spring 208 in the direction of the arrow 216, effecting loading thereof.

With the trigger 82 in the first position and the bail assembly 48 in the cast position, rotation of the rotor 20 through the crank handle 22, 24 causes a projecting end 220 of the trip link 206 to engage and slide along a surface 222 on a trip link actuator 224. The plane of the surface 222 is non-parallel to the axis 38. Rotational movement of the rotor 20 causes the surface 222 to progressively cam the trip link 206, through the end 220, forwardly towards the retracted position. The spring 208 continuously urges the trip link 206 forwardly as this occurs. As the bail assembly 48 approaches the retrieve position, the overcenter bias mechanism 184 drives the bail assembly 48 fully into the retrieve position. The spring 208 in turn draws the trip link fully forwardly to the retracted position.

In the reel 10 shown, the trip link actuator 224 is defined by a separate element 226 which is attached to the trigger 82. The element 226 has a body 228 having a "U" shape which receives an undercut portion 230 of the trigger 82 in the vicinity of the bore 96. The mounting pin 94 extends through spaced legs 232, 234 defining the U-shaped body 228, and the trigger mounting portion 86 therebetween, to simultaneously mount the trigger 82 on the frame 12 and maintain the element 226 operatively connected to the trigger 82, whereby the element 226 itself moves with the trigger 82 between first and second different positions corresponding to the first and second trigger positions.

The trigger 82 is situated relative to a mounting foot 236 on the frame 12 so that with the mounting foot 236 attached to a rod (not shown), the actuating arm 84 on the trigger 82 is accessible to the index finger of an operator's hand that is grasping both the rod and the mounting foot 236.

The basic functions of the reel will now be described. With the bail assembly 48 in the retrieve position, the crank handle 22, 24 can be operated to drive the rotor 20 which, through the bail assembly 48, wraps line around the spool 70. To initiate a cast, the user draws the actuating arm 84 on the trigger 82 in the direction of the arrow 85 to pivot the trigger 82 from the first position to the second position. This drives the bail moving assembly 108 forwardly, which in turn pivots the link shaft 144 and link cam 146, with the latter in turn pivoting the link arm lever assembly 148 so as to drive the bail assembly 48 out of the retrieve position towards the cast position. The overcenter bias mechanism 184 drives the bail assembly 48 fully into the cast position, extending the trip link 206 in the process. By maintaining the trigger 82 in the second position, the pin 204 on the link arm lever assembly 148 holds the line in such a manner that it cannot pay off of the spool 70. As the user thrusts the reel 10 in the direction of a cast, the trigger 82 is released, allowing the link arm lever assembly 148 to reposition so that the line can clear the pin 204 and pay out. At the completion of the cast, the crank handle 22, 24 is operated. The trip link 206, in the extended position, is brought into contact with the trip link actuator surface 222 and cammed forwardly thereby as the rotor 20 moves to urge the bail assembly 48 back towards the retrieve position. As the bail assembly 48 moves sufficiently towards the retrieve position, the overcenter bias mechanism 184 produces a force that drives the bail assembly 48 fully into the retrieve position.

Below is a more detailed description of various portions of the fishing reel 10, described in FIG. 1. Various other structural details, which are not apparent from FIG. 1, can also be seen in the basic HYPERCAST® reel, which is described in detail in U.S. Pat. No. 5,620,149, which disclosure is incorporated herein by reference.

TRIGGER 82 CONSTRUCTION AND MOUNTING

Referring to FIGS. 2–8 and 21–25, the cooperation between the trigger 82, the element 226 and the frame 12 is shown in greater detail. By making the trigger 82 and element 226 as separate pieces, the trigger 82 and element 226 can be conveniently made from two different materials. For example, the trigger 82 is preferably made from metal due to the substantial bending forces that are applied thereto, whereas the element 226 is molded as one piece from plastic to, among other things, avoid generation of noise as may occur when the trip link 206 contacts the element 226.

A base portion 238 of the element 226 is thickened where the legs 232, 234 meet to provide the necessary rigidity to the surface 222 on the trip link actuator 224.

The element 226 has a depending portion 240 with a V-shaped surface 242 designed to deflect the projecting end 220 of the trip link 206 slightly circumferentially in the event that the trigger 82 is moved into the second position with the trip link end 220 circumferentially aligned directly over the element 226.

The undercut portion 230 on the trigger 82 conforms to the shape of the element 226. Because of the depending portion 240, the element is asymmetrical relative to a horizontal line bisecting the legs 232, 234, as a result of which the element 226 can be assembled only with the element 226 right side up. With the element 226 assembled, bores 244, 246 through the legs 232,234 align with the bore 96 through the trigger 82 to allow the pin 94 to be directed therethrough.

Figure 7:
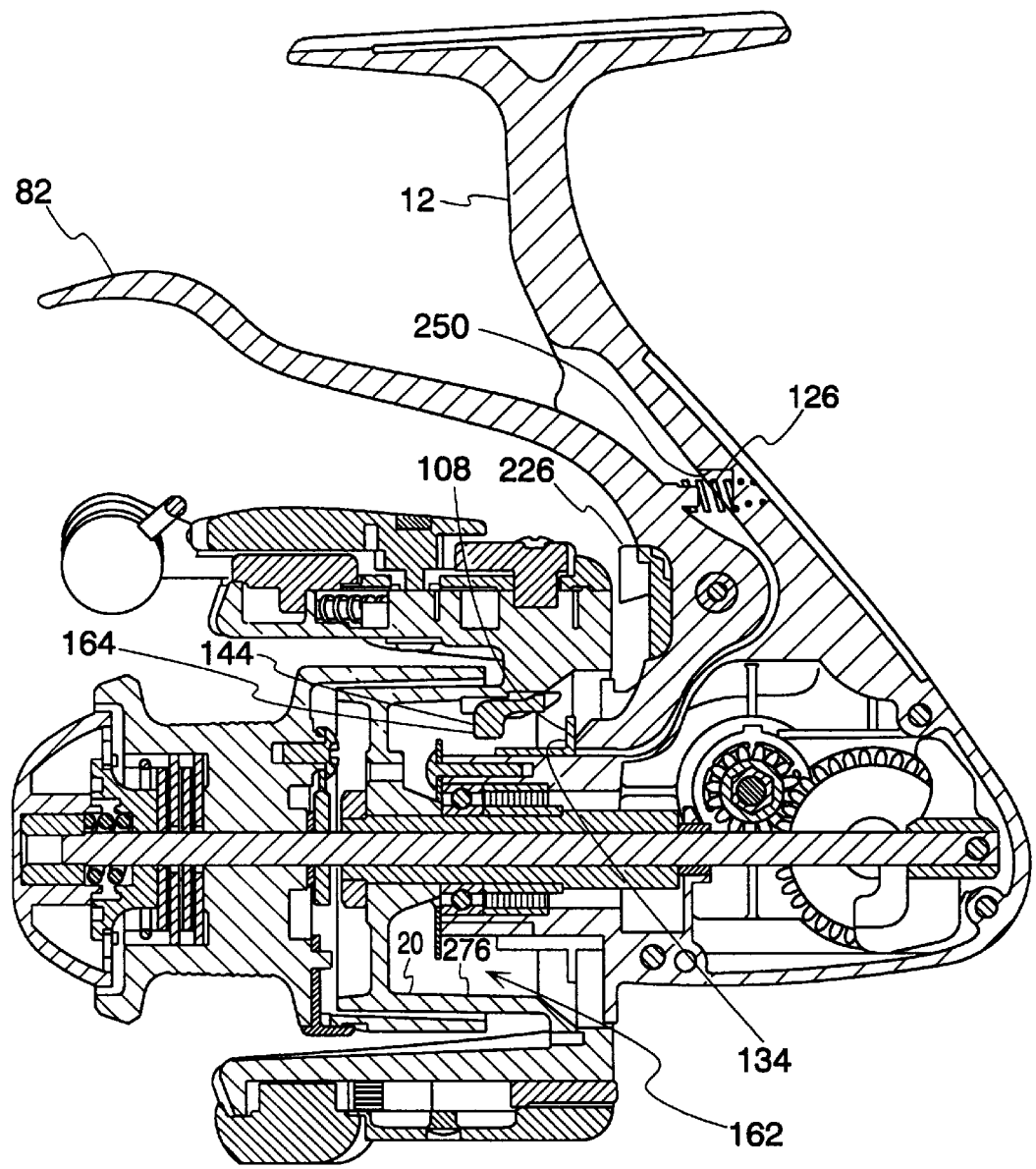
FIG. 7 is a cross-sectional view of the fishing reel taken along line 7—7 of FIG. 2.
Figure 8:
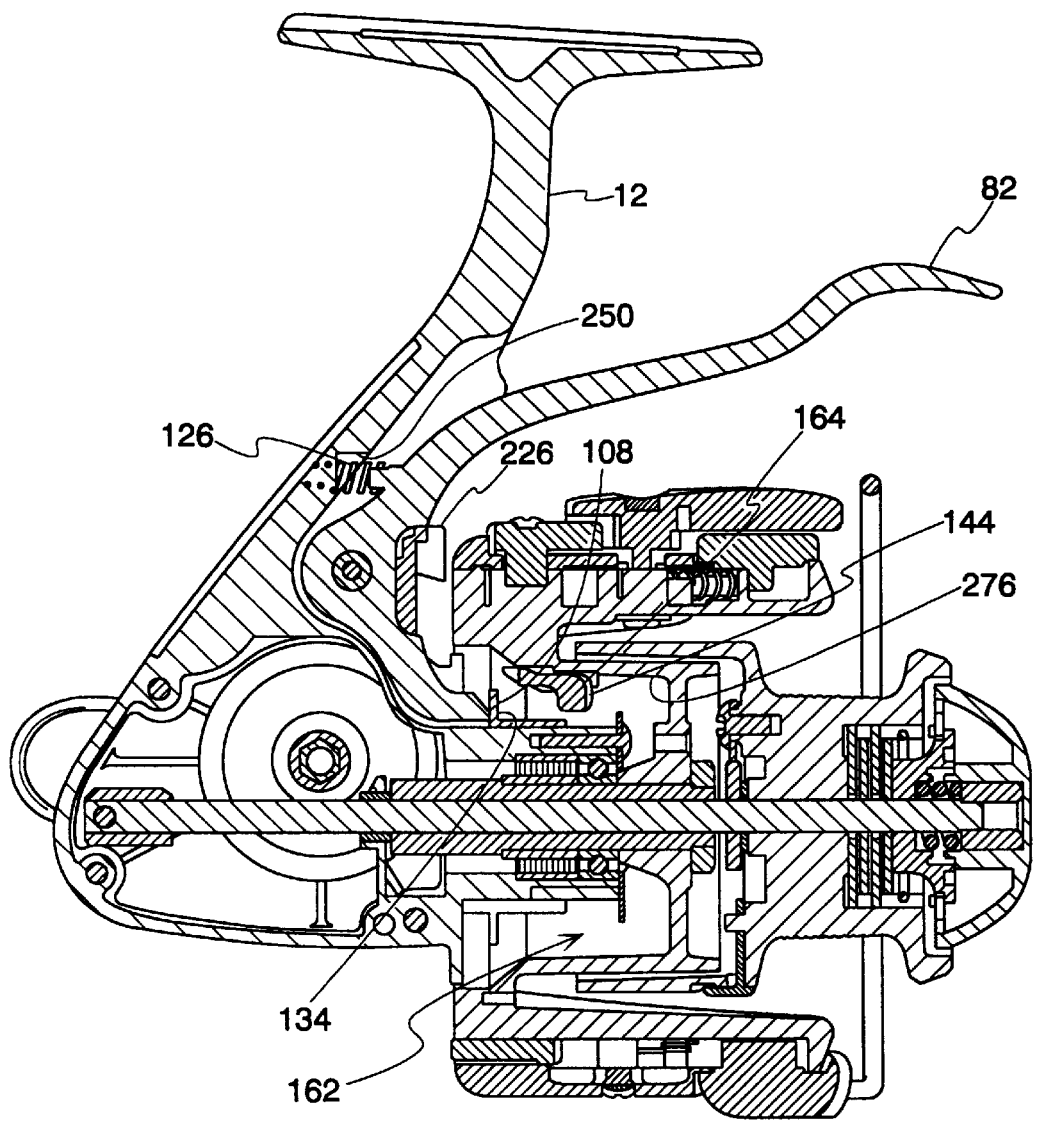
FIG. 8 is a cross-sectional view of the fishing reel taken along line 8—8 of FIG. 2.

In FIGS. 7 and 8, a receptacle 250 is shown in the frame 12 to accommodate the spring 126 that biases the trigger 82 towards the first position.

Referring now to FIGS. 15 and 16, the bail ear 64 on the rotor 20 is shown with the cover 215 removed therefrom. In FIG. 15, the trip link 206 is in the retracted position, in which the trip link 206 resides with the bail assembly 48 in the retrieve position. The first coil 210 on the spring 208 is biased against the trip link surface 218, thereby urging the trip link 206 toward the retracted position. Movement of the bail assembly 48 from the retrieve position into the cast position results in the trip link 206 being driven down to the extended position shown in FIG. 16. A surface 252 on the trip link 206 abuts to a facing surface 254 defined on a boss 256 on the ear 64 so that the trip link 206 consistently achieves, and does not move beyond, the extended position.

Aside from urging the trip link 206 towards the retracted position, the spring 208 exerts a force on the trip link 206 that urges an elongate edge 258 on the trip link 206 against an elongate guide edge 260 on the ear 64. Through this arrangement, the trip link 206 is smoothly guided in a translatory path, as indicated by the double-headed arrow 262, between the extended and retracted positions.

Figure 2:
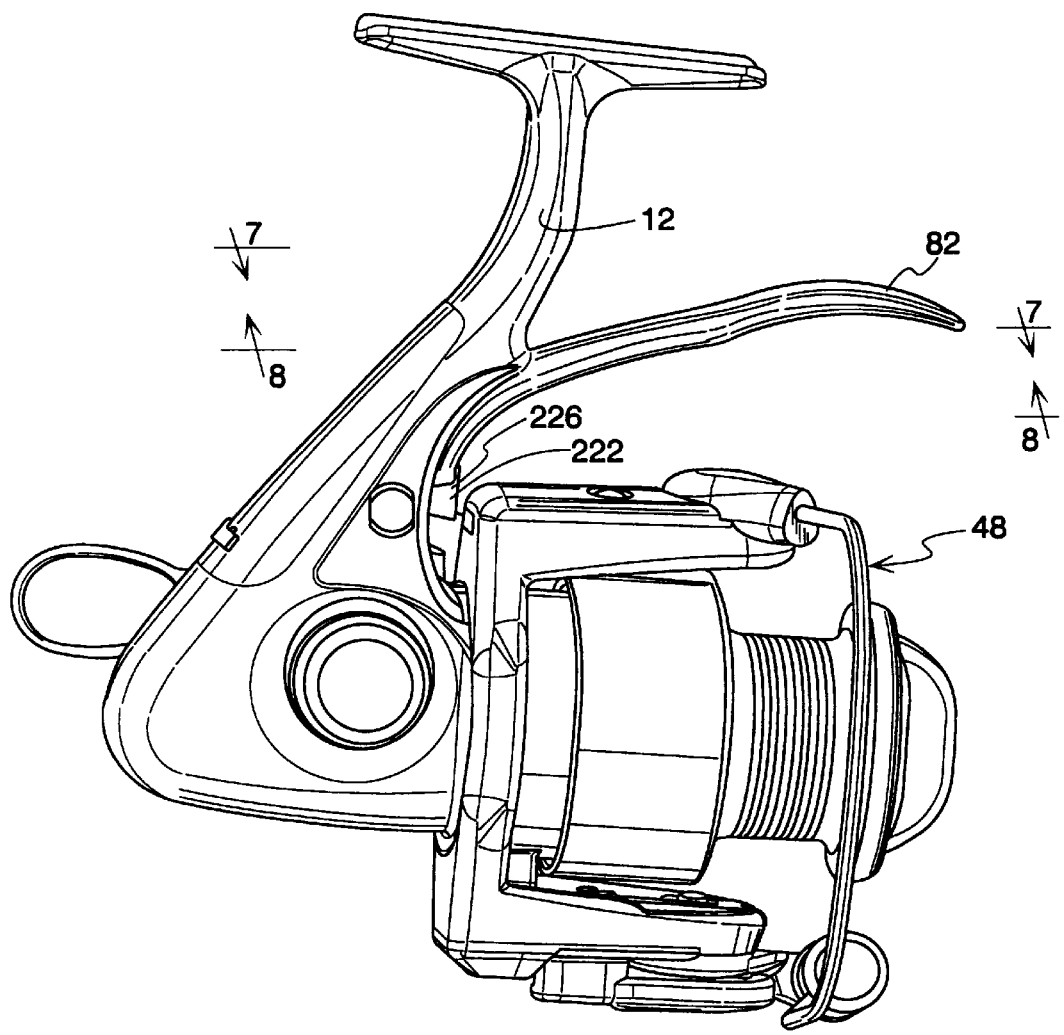
FIG. 2 is a perspective view of the fishing reel in FIG. 1 in an assembled state with a bail assembly on the fishing reel in a retrieve position and a trigger for repositioning the bail assembly in a first position.

With the trip link 206 in the extended position, the projecting end 220 extends rearwardly from the rotor 20. The trip link 206 traces a predetermined path as the rotor 20 is operated. As can be seen in FIG. 2, with the trigger 82 in the first position, the bail assembly 48 in the retrieve position, and the trip link 206 in the retracted position, there is no interference that can occur between the trip link 206 and the surface 222. However, the surface 222, as shown in FIG. 2, resides within the predetermined path that would be traced by the trip link 206, were it in its extended position.

Figure 4:
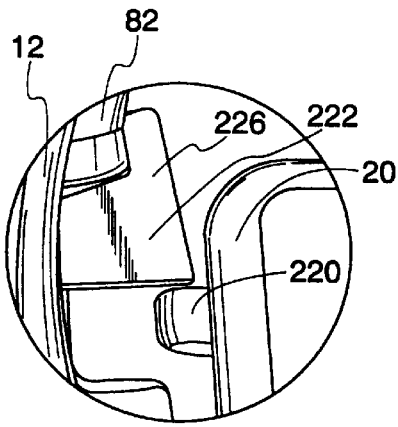
FIG. 4 is an enlarged, fragmentary, side elevation view showing the relationship between a trip link and an actuator surface for the trip link with the fishing reel in the FIG. 3 state.
Figure 3:
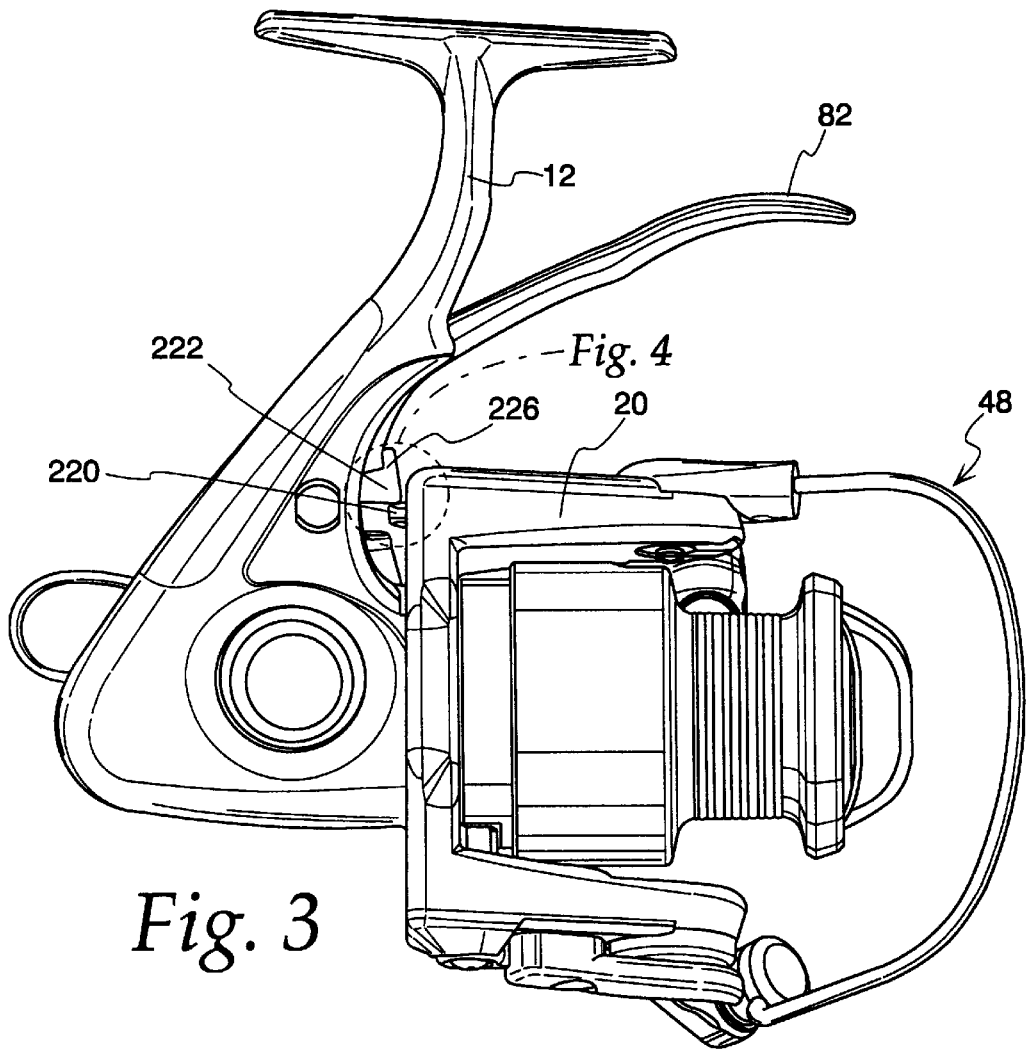
FIG. 3 is a view as in FIG. 2 with the trigger being moved from the first position towards a second position and the bail assembly being moved from the retrieve position towards a cast position.

Referring now to FIGS. 3 and 4, as the trigger 82 is moved from the first position towards the second position, the bail assembly 48 begins a transition from the retrieve position towards the cast position, which results in a rearward movement of the projecting end 220 of the trip link 206 from the rotor 20. As the trigger 82 pivots, the surface 222 begins to move out of the predetermined path that would be traced by the projecting end 220 of the trip link 206 were the trip link 206 fully in the extended position.

Figure 5:
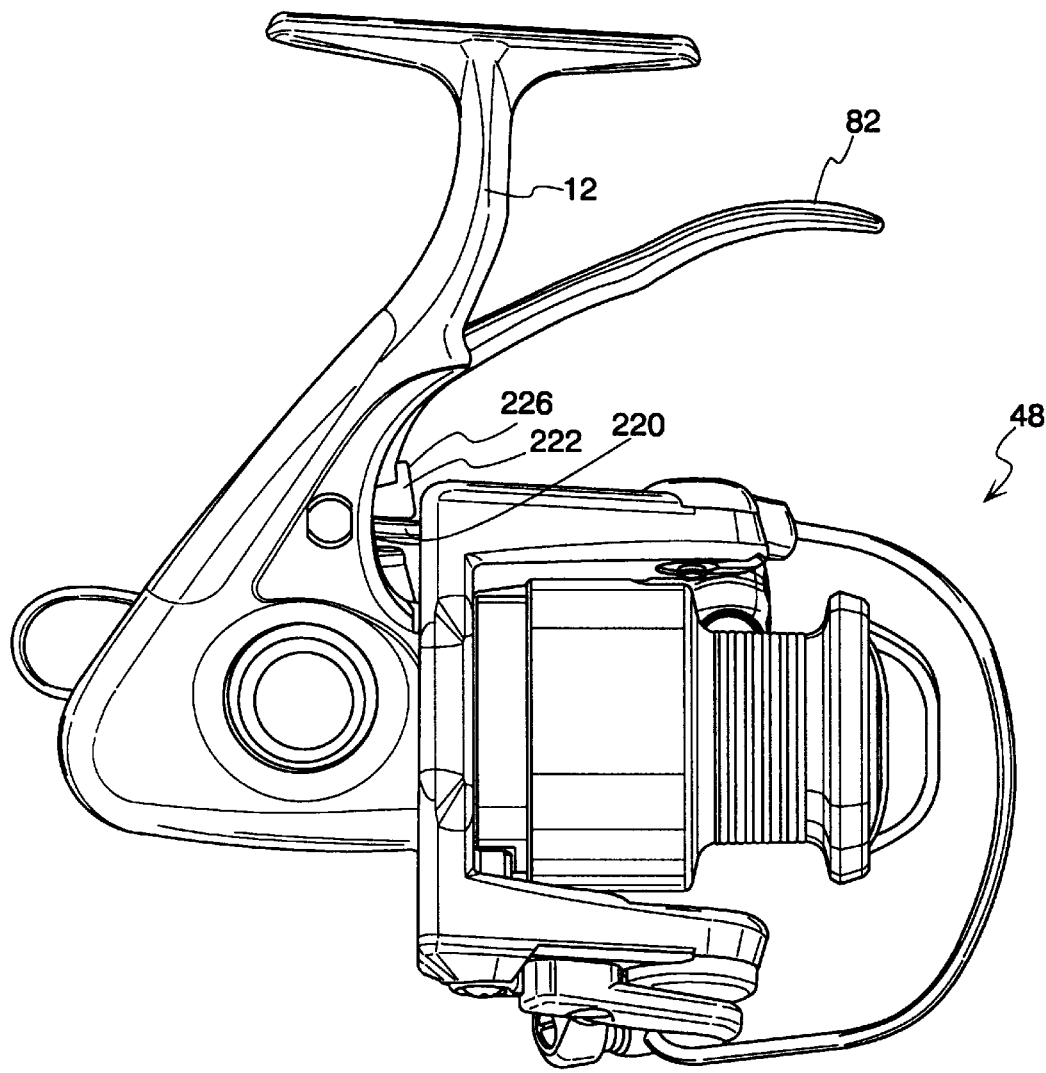
FIG. 5 is a view as in FIGS. 2 and 3 wherein the bail assembly is fully in the cast position and the trigger is fully in the second position.
Figure 6:
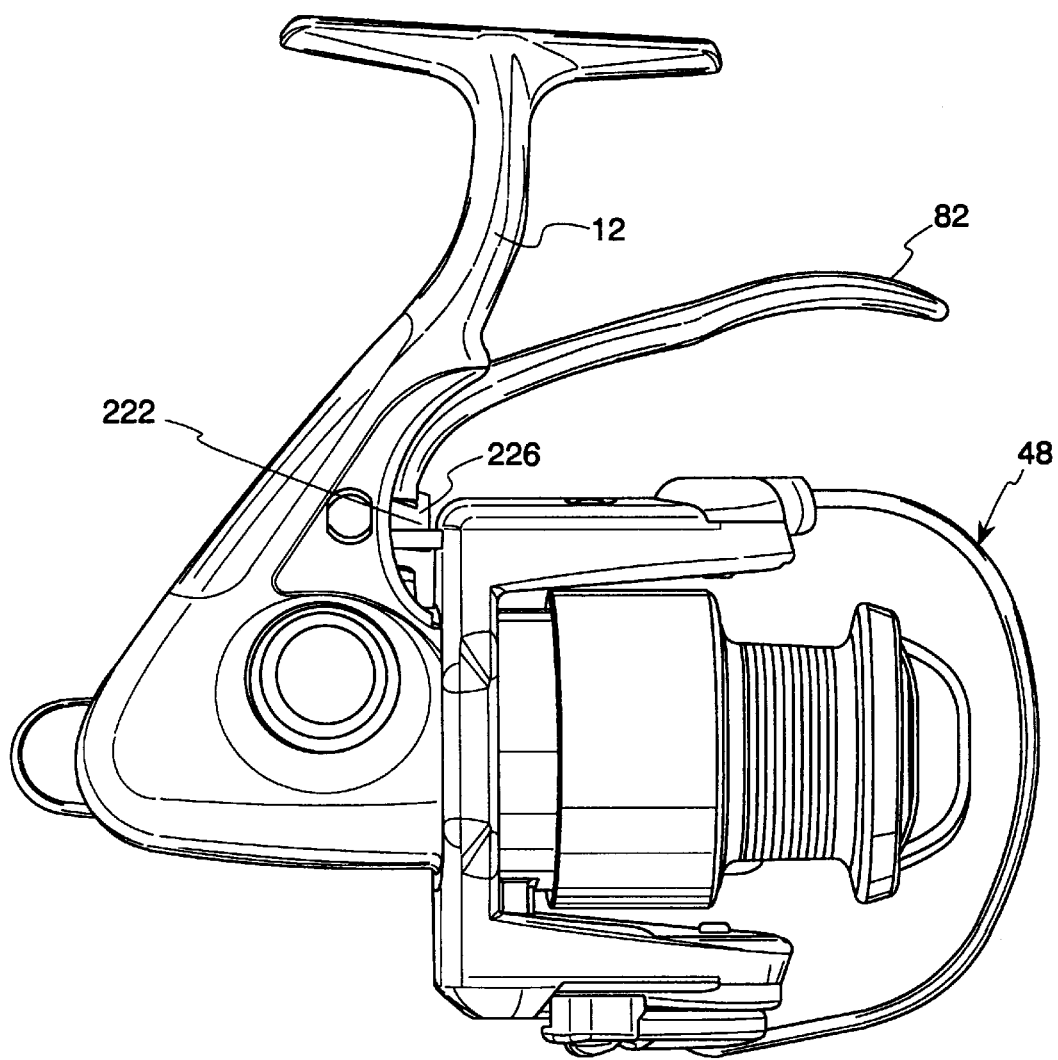
FIG. 6 is a view as in FIG. 5 with the trigger released back to the first position with the bail assembly in the cast position.

Referring now to FIG. 5, as the trigger 82 moves into the second position, the bail assembly 48 assumes the cast position, whereupon the trip link 206 is in the extended position. In the second position for the trigger 82, the surface 222 is moved substantially, and preferably fully, out of the predetermined path traced by the projecting end 220 of the trip link 206. Incidental contact between the trip link end 220 and actuator surface 222 can be tolerated. As a consequence, there is no point through the 360° range of movement of the rotor 20 that the trip link 206 interferes with the surface 222 with the trigger 82 in the second position. The path of the trip link 206 does not have to be altered, in the event that the trip link 206 extends at the precise location where the surface 222 is located, to allow the trip link 206 to move into the extended position.

COOPERATION BETWEEN THE TRIGGER 82, FRAME 12, AND BAIL MOVING ASSEMBLY 108

Referring now to FIGS. 7–14, the cooperation between the trigger 82, frame 12, and bail moving assembly 108 is shown in greater detail. The three ribs 114 on the frame 12 are shown in FIGS. 9, 11 and 14 with the complementary grooves 116 on the bail moving assembly 108 shown in FIGS. 12 and 13. Both receptacles 120 on the bail moving assembly 108 are shown in FIG. 12.

Referring to FIGS. 9–11, with the trigger 82 in the first position, the free end 104 of the yoke 100 is fully seated in the receptacle 120, which has a complementary shape. With the trigger 82 in the first position, the yoke 100 is drawn fully rearwardly so that a rearwardly facing surface 264 on the yoke 100 is urged facially against a forwardly facing surface 266 on the frame 12.

As the trigger 82 is moved from the first position towards the second position, a forwardly facing surface 268 on the free end 104 of the yoke 100 bears against the rearwardly facing surface 122 to shift the bail moving assembly 108 forwardly. As the yoke 100 pivots, the free end 104 moves out of the receptacle 120, thereby avoiding interference with the tab 118 bounding the receptacle 120. In FIG. 10, the bail moving assembly 108 is shifted forwardly fully into its opening position.

By releasing the trigger 82, the trigger 82 is urged from the second position of FIG. 10 back towards the first position of FIG. 9. As this transition occurs, the forwardly facing surface 268 on the free yoke end 104 separates from the surface 122. A rearwardly facing surface 272 on the yoke free end 104 bears against a free, upwardly projecting portion 274 of the tab 118, thereby drawing the bail moving assembly 108 rearwardly to the normal position. The free yoke end 104 moves progressively into the receptacle 120 as it slides the bail moving assembly 108 rearwardly until the normal position of FIG. 9 is realized.

COOPERATION BETWEEN THE BAIL MOVING ASSEMBLY 108 AND LINK SHAFT 144

The cooperation between the bail moving assembly 108 and link shaft 144 is shown in greater detail in FIGS. 7, 8, 18 and 19. The arm 164 projects from the cylindrical body 150 in a curved path that conforms generally to the curvature of a wall 276 on the rotor 220 bounding the cavity 162.

The annular surface 134 of the bail moving assembly 108 is dimensioned to substantially fully radially overlie approximately the outer one fourth of the length of the arm 164 at the free end 278 thereof. The surface 134 acts directly against the approximately outer fourth of the arm 164 as the bail moving assembly 108 advances forwardly from the normal position into the opening position to change the bail assembly 48 from the retrieve position into the cast position.

COOPERATION BETWEEN THE LINK SHAFT 144, LINK CAM 146, AND LINK ARM LEVER ASSEMBLY 148

The cooperation between the link shaft 144, link cam 146, and link arm lever assembly 148 is shown in greater detail in FIG. 17. The cylindrical body 115 of the link shaft 144 has diametrically opposite flats 280, 282 which key within a complementary bore 284 through the link cam 146. The link cam 146 has a projecting arm 286 on which the cam surface 170 is defined. The cam surface 170 acts against the surface 172 on the link arm lever assembly 148, which surface 172 has a convex shape.

An undercut 288 is formed in the link arm lever assembly 148 to accommodate the post 180 on the bail arm 54. The undercut defines a surface 290 along which the post 180 slides as the link arm lever assembly 148 cams the bail assembly 48 from the retrieve position towards the cast position.

The trigger 82, bail moving assembly 108, link shaft 144, link cam 146, and link arm lever assembly 148 cooperatively define a bail actuating system through which a force exerted on the trigger 82 is transmitted to the bail assembly 48. Pivoting of the trigger 82 is converted to a fore and aft translational movement of the bail moving assembly 108. The link shaft 144, link cam 146, and link arm lever assembly 148 cooperatively define a motion changing linkage which transmits a forward force produced by the bail moving assembly 108 into a torque on the bail arm 54. It has been found that it is necessary to produce a pivoting force through the bail moving assembly 108 directly to only the one arm 54. This pivoting force is transferred through the bail wire 50 to the other bail arm 52.

In one form, the bail moving assembly 108 has one piece that acts between the frame 12 and trigger 82 and the link shaft 144. The link shaft 144 has one piece that is acted directly upon by the bail moving assembly 108 and acts directly against the link cam 146, which rotates as one piece with the link arm 144 around the axis 166. The link cam 146 in turn has one piece that acts directly against the link arm lever assembly 148 and which is directly acted against by the link shaft 144. The link arm lever assembly 148 in turn has one piece that acts directly against the post 180 on the bail arm 54 and which is acted directly upon by the link cam 146.

The foregoing disclosure of specific embodiments is intended to be illustrative of the broad concepts comprehended by the invention.

What is claimed is:

1. A fishing reel comprising:

a frame having a first axis and forward and rear ends spaced axially relative to the first axis; and an operating mechanism on the frame, the operating mechanism comprising a line carrying spool, a rotor that is rotatable around the first axis relative to the frame, a bail assembly on the frame which is changeable between a cast position and a retrieve position, a rotor operator, and a drive train through which the rotor is rotated around the first axis in response to operation of the rotor operator, the operating mechanism further comprising a bail actuating system for moving the bail assembly from the retrieve position into the cast position, the bail actuating system comprising a bail moving assembly which moves in a fore and aft direction relative to the frame, and a motion changing linkage which produces a force on the bail assembly that urges the bail assembly from the retrieve position towards the cast position as an incident of the bail moving assembly moving from a normal position forwardly relative to the frame into an opening position, wherein the bail moving assembly comprises a portion that cooperates with the frame to guide the bail moving assembly between the normal and opening positions.

2. The fishing reel according to claim 1 wherein the bail actuating system further comprises a trigger that is movable relative to the frame and the bail moving assembly between first and second positions, the bail moving assembly moving from the normal position as an incident of the trigger moving from the first position into the second position.

3. The fishing reel according to claim 2 wherein the trigger is pivotable around a second axis in moving between the first and second positions.

4. The fishing reel according to claim 3 wherein the second axis is substantially orthogonal to the first axis.

5. The fishing reel according to claim 2 wherein the rotor is pivotable through a range of 360° around the first axis and the trigger is movable between the first and second positions to change the bail assembly from the retrieve position into the cast position with the rotor situated through substantially the entire 360° range.

6. The fishing reel according to claim 1 wherein the bail moving assembly comprises a single piece which acts between the frame and the motion changing linkage.

7. The fishing reel according to claim 1 wherein the bail moving assembly is guided in movement between the normal and opening positions independently of the rotor.

8. The fishing reel according to claim 1 wherein the motion changing linkage comprises a link shaft that is pivotable around an axis that is transverse to the first axis to cause the bail assembly to change from the retrieve position into the cast position, the bail moving assembly pivoting the link shaft as an incident of the bail moving assembly moving from the normal position into the opening position.

9. The fishing reel according to claim 8 wherein the motion changing linkage comprises a link cam which pivots as one piece with the link shaft and the link shaft and link cam are connected to each other through the rotor.

10. The fishing reel according to claim 9 wherein the bail assembly comprises first and second bail arms pivotably attached to the rotor, the motion changing linkage comprises a link arm lever assembly which is attached to the rotor for pivoting movement, the link arm lever assembly directly engages the first bail arm and pivots the bail assembly from the retrieve position towards the cast position as an incident of the link cam pivoting with the link shaft.

11. The fishing reel according to claim 10 wherein the link cam acts directly against the link arm lever assembly to effect pivoting of the link arm lever assembly as an incident of the link cam pivoting.

12. The fishing reel according to claim 11 wherein the bail assembly comprises a bail wire, a pin projects from the link arm lever assembly and is movable with the link arm lever assembly towards the bail wire to hold line projecting from the line carrying spool, with the trigger in the second position, and away from the bail wire to allow line on the line carrying spool to pay off of the line carrying spool with the trigger in the first position.

13. The fishing reel according to claim 11 wherein the bail moving assembly acts directly against the link shaft, the link shaft has one piece that is acted directly upon by the bail moving assembly and acts directly against the link cam, the link arm lever assembly comprises one piece which is acted upon by the link cam and which acts directly against the first bail arm and the link cam has one piece that acts directly against the link arm lever assembly and which is acted directly upon by the link shaft.

14. The fishing reel according to claim 1 wherein the bail assembly is pivotable between the cast and retrieve positions.

15. A fishing reel comprising:
a frame having a first axis and forward and rear ends spaced axially relative to the first axis; and
an operating mechanism on the frame,
the operating mechanism comprising a line carrying spool, a rotor that is rotatable around the first axis relative to the frame, a bail assembly on the frame which is changeable between a cast position and a retrieve position, a rotor operator, and a drive train through which the rotor is rotated around the first axis in response to operation of the rotor operator,
the operating mechanism further comprising a bail actuating system for moving the bail assembly from the retrieve position into the cast position,
the bail actuating system comprising a bail moving assembly which moves in a fore and aft direction relative to the frame, and a motion changing linkage which produces a force on the bail assembly that urges the bail assembly from the retrieve position towards the cast position as an incident of the bail moving assembly moving from a normal position forwardly relative to the frame into an opening position,
wherein the bail moving assembly comprises a portion that cooperates with the frame to guide the bail moving assembly between the normal and opening positions,
wherein the bail actuating system further comprises a trigger that is movable relative to the frame and the bail moving assembly between first and second positions, the bail moving assembly moving from the normal position as an incident of the trigger moving from the first position into the second position,
wherein the portion of the bail moving assembly is substantially cylindrical, the frame has a projection, and the portion of the bail moving assembly surrounds the projection and is guided by the projection between the normal and opening positions.

16. The fishing reel according to claim 15 wherein there is a rib and groove, one each of the bail moving assembly and projection on the frame, which cooperate to limit relative rotation between the bail moving assembly and projection on the frame around the first axis and guide the bail moving assembly between the normal and opening positions.

17. A fishing reel comprising:
a frame having a first axis and forward and rear ends spaced axially relative to the first axis; and
an operating mechanism on the frame,
the operating mechanism comprising a line carrying spool, a rotor that is rotatable around the first axis relative to the frame, a bail assembly on the frame which is changeable between a cast position and a retrieve position, a rotor operator, and a drive train through which the rotor is rotated around the first axis in response to operation of the rotor operator,
the operating mechanism further comprising a bail actuating system for moving the bail assembly from the retrieve position into the cast position,
the bail actuating system comprising a bail moving assembly which moves in a fore and aft direction relative to the frame, and a motion changing linkage which produces a force on the bail assembly that urges the bail assembly from the retrieve position towards the cast position as an incident of the bail moving assembly moving from a normal position forwardly relative to the frame into an opening position,
wherein the bail moving assembly comprises a portion that cooperates with the frame to guide the bail moving assembly between the normal and opening positions,
wherein the bail actuating system further comprises a trigger that is movable relative to the frame and the bail moving assembly between first and second positions, the bail moving assembly moving from the normal position as an incident of the trigger moving from the first position into the second position,
wherein the trigger is pivotable around a second axis in moving between the first and second positions,
wherein the bail moving assembly has a first receptacle, the trigger has a first free end which is movable within the first receptacle as the trigger moves between the first and second positions and the bail moving assembly moves between the normal and opening positions.

18. The fishing reel according to claim 17 wherein the trigger has a second free end spaced from the first free end, the bail moving assembly has a second receptacle, and the second free end is movable within the second receptacle as the trigger moves between the first and second positions and the bail moving assembly moves between the normal and opening position.

19. A fishing reel comprising:
a frame having a first axis and forward and rear ends spaced axially relative to the first axis; and
an operating mechanism on the frame,
the operating mechanism comprising a line carrying spool, a rotor that is rotatable around the first axis relative to the frame, a bail assembly on the frame which is changeable between a cast position and a retrieve position, a rotor operator, and a drive train through which the rotor is rotated around the first axis in response to operation of the rotor operator,
the operating mechanism further comprising a bail actuating system for moving the bail assembly from the retrieve position into the cast position,
the bail actuating system comprising a bail moving assembly which moves in a fore and aft direction relative to the frame, and a motion changing linkage which produces a force on the bail assembly that urges the bail assembly from the retrieve position towards the cast position as an incident of the bail moving assembly moving from a normal position forwardly relative to the frame into an opening position, wherein the bail moving assembly comprises a portion that cooperates with the frame to guide the bail moving assembly between the normal and opening positions, wherein the motion changing linkage comprises a link shaft that is pivotable around an axis that is transverse to the first axis to cause the bail assembly to change from the retrieve position into the cast position, the bail moving assembly pivoting the link shaft as an incident of the bail moving assembly moving from the normal position into the opening position, wherein the motion changing linkage comprises a link cam which pivots as one piece with the link shaft and the link shaft and link cam are connected to each other through the rotor, wherein the bail assembly comprises first and second bail arms pivotably attached to the rotor, the motion changing linkage comprises a link arm lever assembly which is attached to the rotor for pivoting movement, the link arm lever assembly directly engages the first bail arm and pivots the bail assembly from the retrieve position towards the cast position as an incident of the link cam pivoting with the link shaft, wherein the bail actuating system does not act against the second bail arm so that a force produced on the bail arm by the bail moving assembly is transmitted directly to only the first bail arm and not the second bail arm.

20. The fishing reel according to claim 19 wherein the bail assembly comprises a bail wire and a force on the second bail arm tending to move the bail assembly from the retrieve position into the cast position as an incident of the bail moving assembly moving from the normal position into the opening position is generated only through the bail wire.

* * * * *